United States Patent
Rojo Lulic

(10) Patent No.: US 7,230,357 B2
(45) Date of Patent: Jun. 12, 2007

(54) EXTERNAL ROTOR MOTOR AND METHOD FOR ASSEMBLING SUCH A MOTOR

(75) Inventor: Francisco Rojo Lulic, St. Georgen (DE)

(73) Assignee: ebm- papst St. Georgen GmbH & Co. KG, St. Georgen (DE)

( * ) Notice: Subject to any disclaimer, the term of this patent is extended or adjusted under 35 U.S.C. 154(b) by 0 days.

(21) Appl. No.: 10/501,847

(22) PCT Filed: Sep. 12, 2003

(86) PCT No.: PCT/EP03/10139

§ 371 (c)(1),
(2), (4) Date: Jul. 16, 2004

(87) PCT Pub. No.: WO2004/048791

PCT Pub. Date: Jun. 10, 2004

(65) Prior Publication Data

US 2005/0116557 A1    Jun. 2, 2005

(30) Foreign Application Priority Data

Nov. 26, 2002 (DE) ................................ 102 54 949

(51) Int. Cl.
*H02K 5/16* (2006.01)
*H02K 7/08* (2006.01)
*H02K 15/02* (2006.01)

(52) U.S. Cl. .................. 310/90; 310/261; 310/156.26; 29/598

(58) Field of Classification Search ................... 310/90, 310/91, 261, 253, 154.01, 156.08, 156.16, 310/156.26

See application file for complete search history.

(56) References Cited

U.S. PATENT DOCUMENTS 3,335,942 A * 8/1967 Seigart ........................ 417/384
3,728,563 A * 4/1973 Stone ........................... 310/90

(Continued)

FOREIGN PATENT DOCUMENTS

DE         34 04 466 A1      8/1985

(Continued)

*Primary Examiner*—Burton S. Mullins
*Assistant Examiner*—Erik Preston
(74) *Attorney, Agent, or Firm*—Milton Oliver, Esq.; Ware Fressola Van Der Sluys & Adolphson LLP

(57) ABSTRACT

A method of rapidly assembling the rotor (22) of an external-rotor motor (20) onto a bearing support tube (70) and in a predetermined axial position relative to the latter, includes the steps of: beginning at a rotor cup portion (24) of the rotor (22), mounting on a rotor shaft (28): a compression spring (48), a retaining washer (50), and a plurality of rolling bearings (52, 60); then pressing into the bearing support tube (70), by means of a pressing-in force (K), the rotor (24), with the elements mounted thereon, the compression spring (48) being compressed so that the rotor cup presses the washer (50) into the tube (70); subsequently removing the pressing-in force (K), and displacing the rotor shaft (28) by means of the compression spring (48) within the bearings (52, 60) so that the rotor (24) assumes the desired predetermined axial position, relative to the tube (70).

20 Claims, 8 Drawing Sheets

U.S. PATENT DOCUMENTS

| | | | | |
|---|---|---|---|---|
| 3,990,141 A | * | 11/1976 | Stark | 29/596 |
| 4,471,246 A | * | 9/1984 | Paillet | 310/42 |
| 4,480,206 A | * | 10/1984 | Manson | 310/90 |
| 4,550,814 A | * | 11/1985 | Harry | 192/18 B |
| 4,598,220 A | * | 7/1986 | Stone | 310/90 |
| 4,612,468 A | | 9/1986 | Stürm et al. | 310/67 R |
| 4,613,778 A | * | 9/1986 | Wrobel et al. | 310/90 |
| 5,013,957 A | * | 5/1991 | Wrobel | 310/217 |
| 5,073,735 A | * | 12/1991 | Takagi | 310/71 |
| 5,258,672 A | * | 11/1993 | Wrobel | 310/42 |
| 5,274,289 A | | 12/1993 | Wrobel | 310/90 |
| 5,562,347 A | * | 10/1996 | Hsieh | 384/215 |
| 5,719,454 A | * | 2/1998 | Halsey et al. | 310/90 |
| 6,144,135 A | * | 11/2000 | Ho | 310/254 |
| 6,271,611 B1 | * | 8/2001 | Taniguchi et al. | 310/89 |
| 6,617,736 B1 | * | 9/2003 | Horng et al. | 310/91 |
| 6,819,021 B1 | * | 11/2004 | Horng et al. | 310/91 |
| 6,876,112 B2 | * | 4/2005 | Kull | 310/90 |

FOREIGN PATENT DOCUMENTS

| | | |
|---|---|---|
| DE | 41 25 203 A1 | 2/1992 |
| DE | 42 02 153 A1 | 8/1992 |

* cited by examiner

EXTERNAL ROTOR MOTOR AND METHOD FOR ASSEMBLING SUCH A MOTOR

CROSS-REFERENCE

This application is a § 371 of PCT/EP03/010139, filed 12 Sep. 2003 and published 10 Jun. 2004 as WO 2004/048791-A1. The application claims priority from DE 102 54 949.4, filed 26 Nov. 2002, the entire disclosure of which is incorporated by reference.

FIELD OF THE INVENTION

The invention concerns an external-rotor motor, and it concerns a method for assembling an external-rotor motor.

BACKGROUND

In many external-rotor motors, the shaft of the external rotor is supported in a so-called bearing support tube on whose outer side a stator lamination stack is mounted. The shaft is usually mounted on the hub of a so-called rotor cup, and is supported within the bearing support tube by means of bearings, e.g. sintered bearings or rolling bearings. The type of bearing system depends principally on the desired service life of the motor and the desired smoothness.

For installation of the shaft, the bearing support tube usually has, on its side facing away from the rotor cup, an opening where components are located that serve to retain or support the shaft, e.g. a thrust bearing, spring member, retaining washer, bearing cover, or the like. Dirt can penetrate through this opening and shorten the service life of such a motor. Time is also needed for assembly, making such motors more expensive.

SUMMARY OF THE INVENTION

It is therefore an object of the invention to make available a novel external-rotor motor, and a new method for assembling such a motor.

According to a first aspect of the invention, this object is achieved by means of an external-rotor motor in which a compression spring, a retaining washer, and a pair of rolling bearings are pre-mounted on the shaft of the rotor, and assembly can be completed by simply sliding the rotor assembly into a bearing support tube in the stator assembly, the lip of the retaining washer serving as a pawl to latch the structure together. In such a motor, the bearing support tube can be largely closed, so that dirt cannot penetrate there. It is also inexpensive to install.

According to another aspect of the invention, this object is achieved by applying compression force to the rotor assembly to compress the spring and to drive the bearings and retaining washer into the bearing support tube, then removing the pressure, thereby allowing the spring to clamp the rolling bearings in place, relative to the rotor shaft. Assembly in this fashion requires only a small number of working steps and can be largely or even completely automated. An advantageous refinement of this method is to provide an annular axial projection on the rotor cup, surrounding the spring, to transfer the pressing force to an outer ring of the nearest rolling bearing. The risk of damage to the rolling bearings upon installation is thus reduced.

BRIEF FIGURE DESCRIPTION

Further details and advantageous refinements of the invention are evident from the exemplary embodiment, in no way to be understood as a limitation of the invention, that is described below and depicted in the drawings.

DETAILED DESCRIPTION

Figure 1:
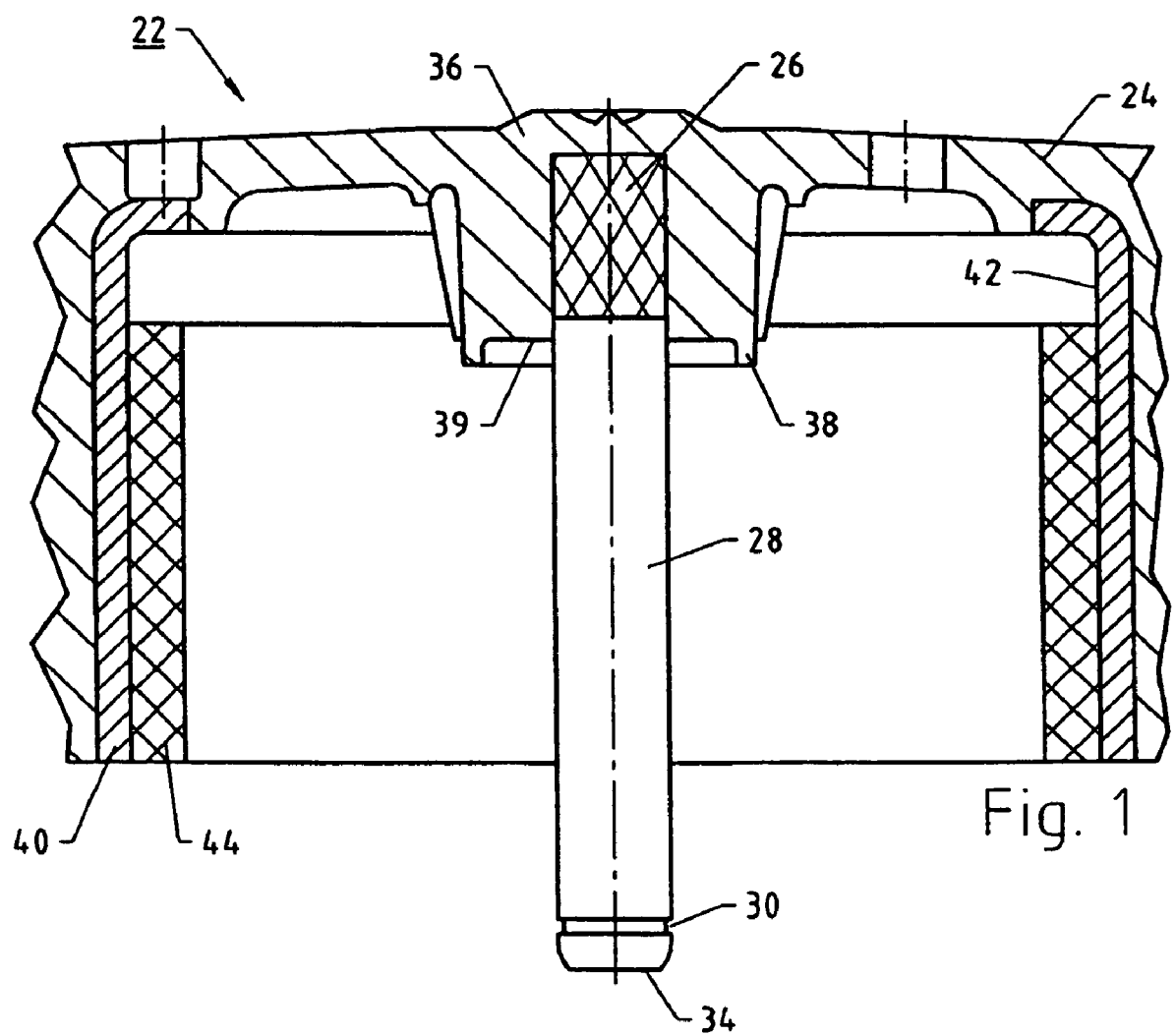
FIG. 1 depicts, in longitudinal section, the essential parts of the external rotor of an external-rotor motor.
Figure 7:
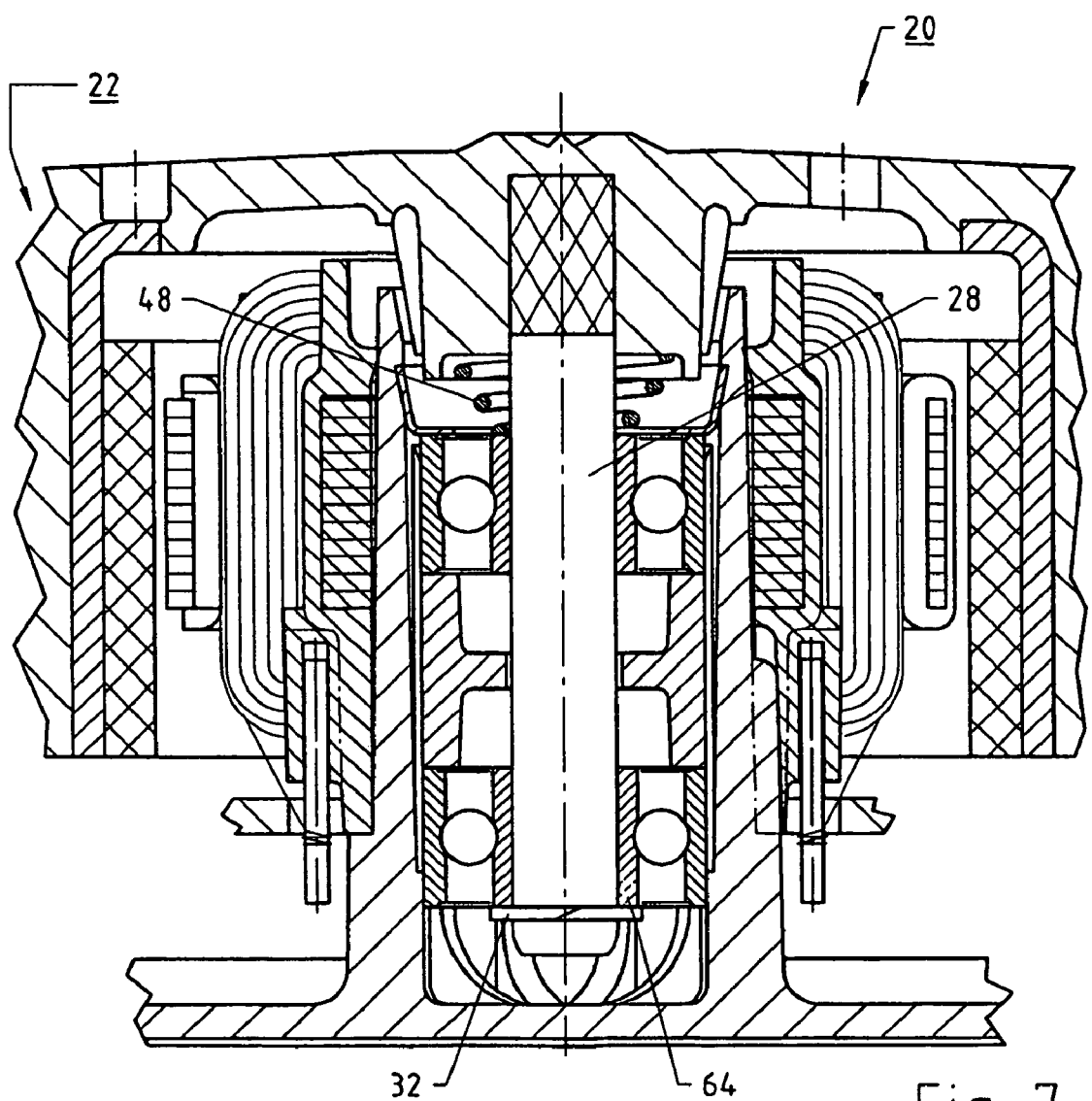
FIG. 7 is a longitudinal section through an assembled motor that can be used, for example, to drive an equipment fan.

FIG. 1 shows an external rotor 22 for an external-rotor motor 20 as depicted in FIG. 7. External rotor 22 has a rotor cup 24 that is usually manufactured from plastic or a lightweight metal.

The parts that are facing toward rotor cup 24 will be referred to hereinafter, by analogy with medical terminology, as "proximal," and the parts facing away from rotor cup 24 as "distal."

Figure 2:
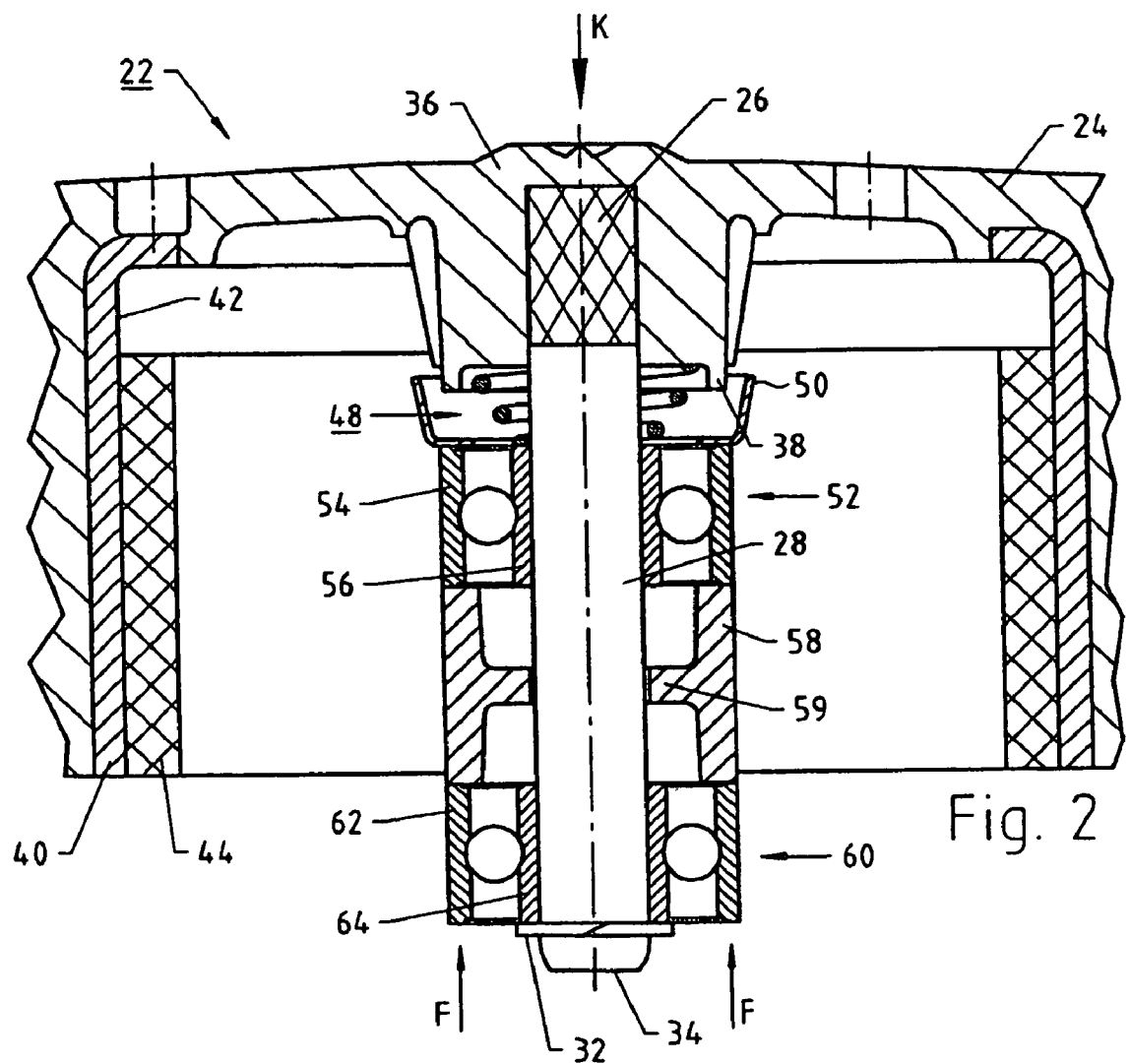
FIG. 2 is a depiction analogous to FIG. 1 in which, however, various elements for a subsequent installation operation are pre-installed on the shaft of the external rotor.

Mounted in the center of rotor cup 24, i.e. on its hub 36, is proximal end 26 of a shaft 28 at the distal end of which is provided an annular groove 30 that serves, as shown in FIG. 2, for mounting of a snap ring 32. The distal end of shaft 28 is labeled 34. Shaft 28 has a cylindrical cross section, and its diameter is constant over practically the entire length. Located on hub 36 is an axial projection 38 that protrudes in the distal direction away from hub 36 and has a depressed region 39 in its center.

A magnetic yoke in the form of a sheet-metal ring 40 made of soft iron is mounted in rotor cup 22, and on the ring's inner side is located a (usually flexible) ring 44 made of permanent-magnetic material, usually a so-called rubber magnet, i.e. a mixture of ferromagnetic particles and an elastomer. Ring 44 is magnetized in the radial direction with the requisite number of magnetic poles, e.g. with four poles as is common practice in the art.

As shown in FIG. 2, a variety of components are pre-installed on shaft 28 prior to the assembly of motor 20.

Beginning at projection 38, the first is a compression spring 48 of approximately conical shape whose proximal, larger-diameter end lies in depression 39.

Following spring 48 in the distal direction is an annular retaining member in the form of a retaining washer 50, as described in more detail below with reference to FIGS. 8 and 9. Spring 48 preferably is not in contact against this retaining member 50.

Retaining member 50 is followed by a proximal rolling bearing 52 comprising an outer ring 54 and an inner ring 56. The latter is displaceable in the axial direction on shaft 28 with a small clearance. The distal end of spring 48 is in contact against the proximal end of inner ring 56. Rolling bearing 52 is followed in the distal direction by a spacer 58, which is guided displaceably on shaft 28 by means of a radially inwardly protruding projection 59, and whose proximal end is in contact, as depicted, against the distal end of outer ring 54.

Spacer 58 is followed by a distal rolling bearing 60 comprising an outer ring 62 that is in contact with its proximal end against spacer 58, and comprising an inner ring 64 that is displaceable in the axial direction on shaft 28 with a small clearance and is in contact with its distal end, as depicted, against snap ring 32 when motor 20 is completely assembled. (optionally, a spacer or the like can also be located between snap ring 32 and rolling bearing 60, e.g. in order to compensate for tolerances.)

It is immediately apparent that by pressing with a force F in the proximal direction on distal rolling bearing 60, spring 48 can be compressed and the two rolling bearings 52 and 60, spacer 58, and retaining washer 50 can be displaced in the proximal direction on shaft 28, so that inner ring 64 is no longer in contact against snap ring 32 but becomes spaced away from it. In this case projection 38 of rotor cup 24 comes into contact against retaining washer 50 and allows an axial force to be transferred via the latter, in the distal direction, onto retaining washer 50, outer ring 54, spacer 58, and outer ring 62 when rotor cup 24 is pressed downward, i.e. in the distal direction, by a force K upon assembly. This is depicted below in FIG. 6.

Figure 3:
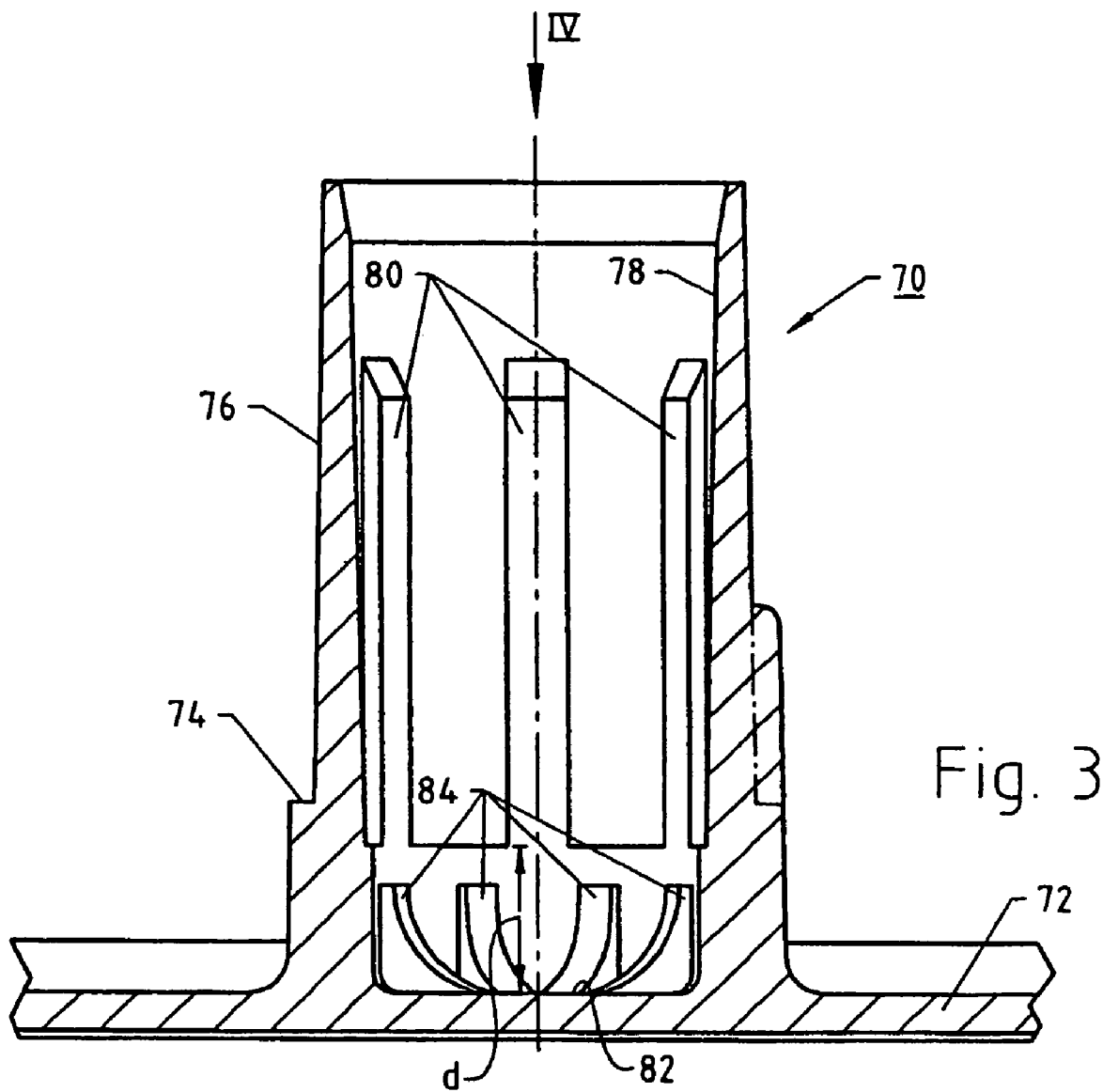
FIG. 3 is a longitudinal section through a bearing support tube provided on the stator of the motor, viewed along line III—III of FIG. 4.
Figure 4:
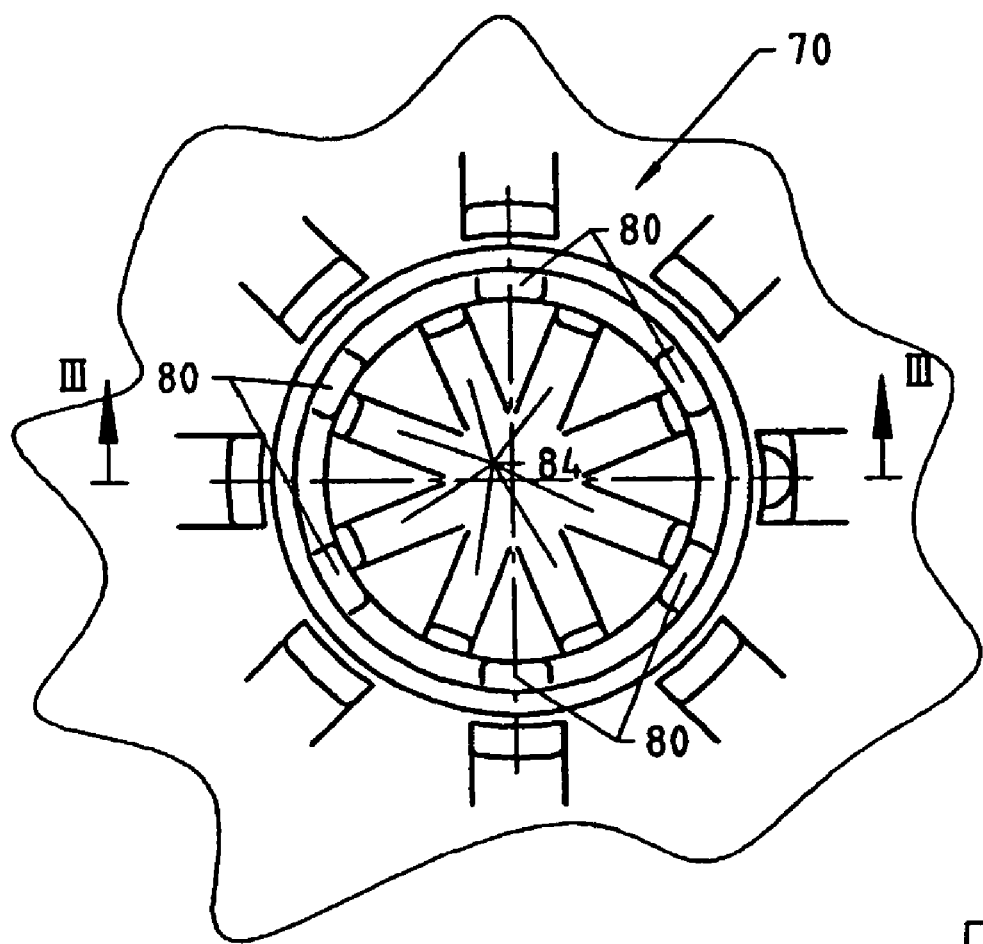
FIG. 4 is a plan view of the open, proximal end of the bearing support tube, viewed in the direction of arrow IV of FIG. 3.

FIG. 3 shows bearing support tube 70 of external-rotor motor 20, which tube is usually manufactured from plastic or a lightweight metal. In this embodiment it has at the bottom a flange 72 that serves to mount motor 20, e.g. to mount it on a fan housing or some other device to be driven.

Bearing support tube 70 has on its outer side a shoulder 74, and adjacent thereto in the proximal direction a circumferential surface 76 that tapers toward the top in frustoconical fashion.

On its inner side 78, bearing support tube 70 has six longitudinal ribs 80 that end at a distance d from the closed distal end 82 of bearing support tube 70. They are followed in the distal region by a total of eight ribs 84 whose proximal ends form, during assembly, a stop for outer ring 62 of distal ball bearing 60 (see FIG. 7). These ribs 84 taper in the proximal direction so that distal end 34 of shaft 28 has sufficient room during assembly (see FIG. 6). The bearing support tube has projections 86 at its upper, proximal end (see FIG. 6).

Figure 5:
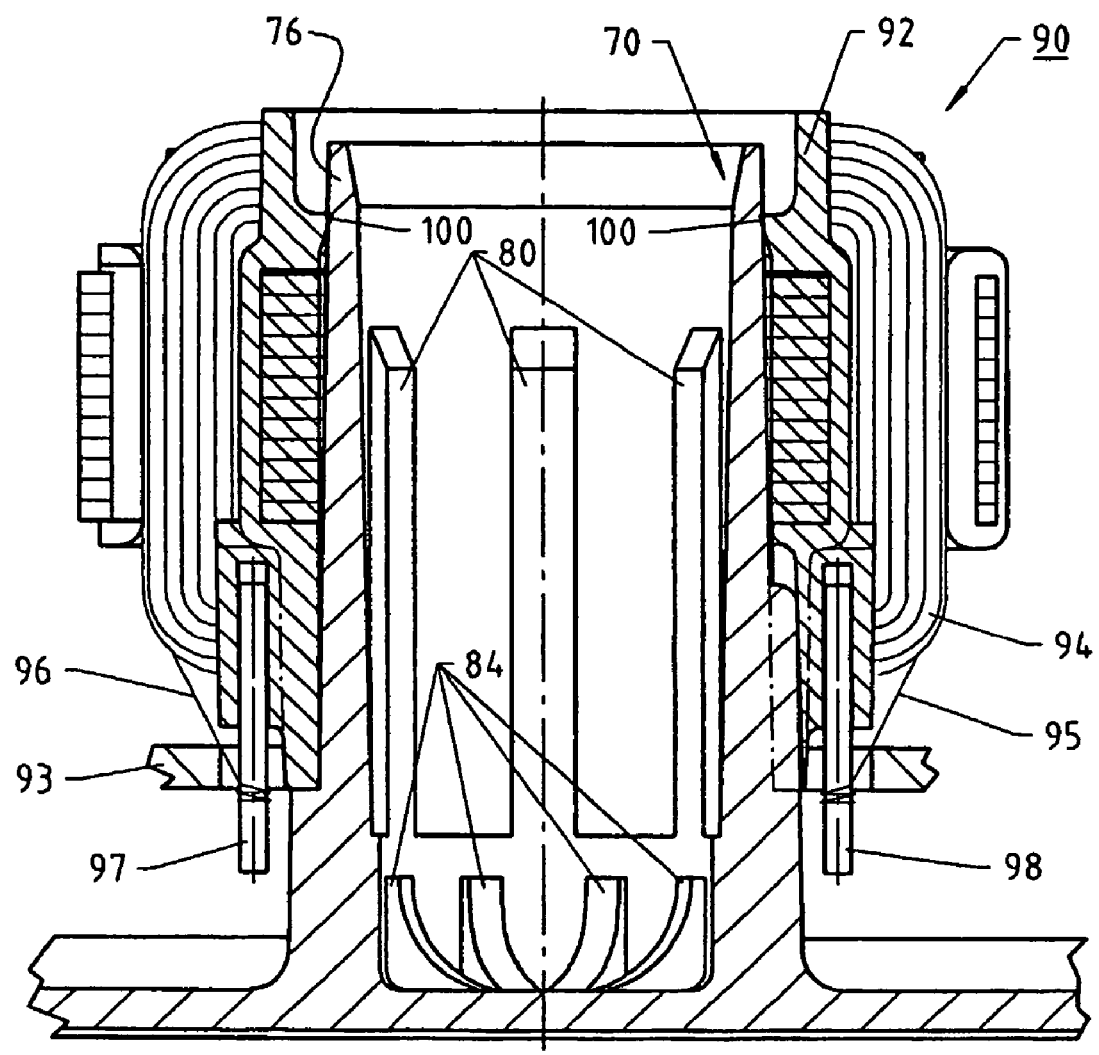
FIG. 5 is a depiction analogous to FIG. 4 in which, however, a circuit board and a stator lamination stack provided with a stator winding are pre-installed on the bearing support tube.

FIG. 5 shows the manner in which a stator lamination stack 90 is mounted on bearing support tube 70. Lamination stack 90 has for this purpose a coil former 92 made of plastic into which a stator winding 94 is wound. A circuit board is indicated at 93. FIG. 5 shows two winding ends 95, 96 that are soldered respectively onto an associated metal pin 98 and 97. Coil former 92 has, as depicted, an inwardly protruding projection 100 with which it is pressed onto outer side 76 of bearing support tube 70.

Figure 6:
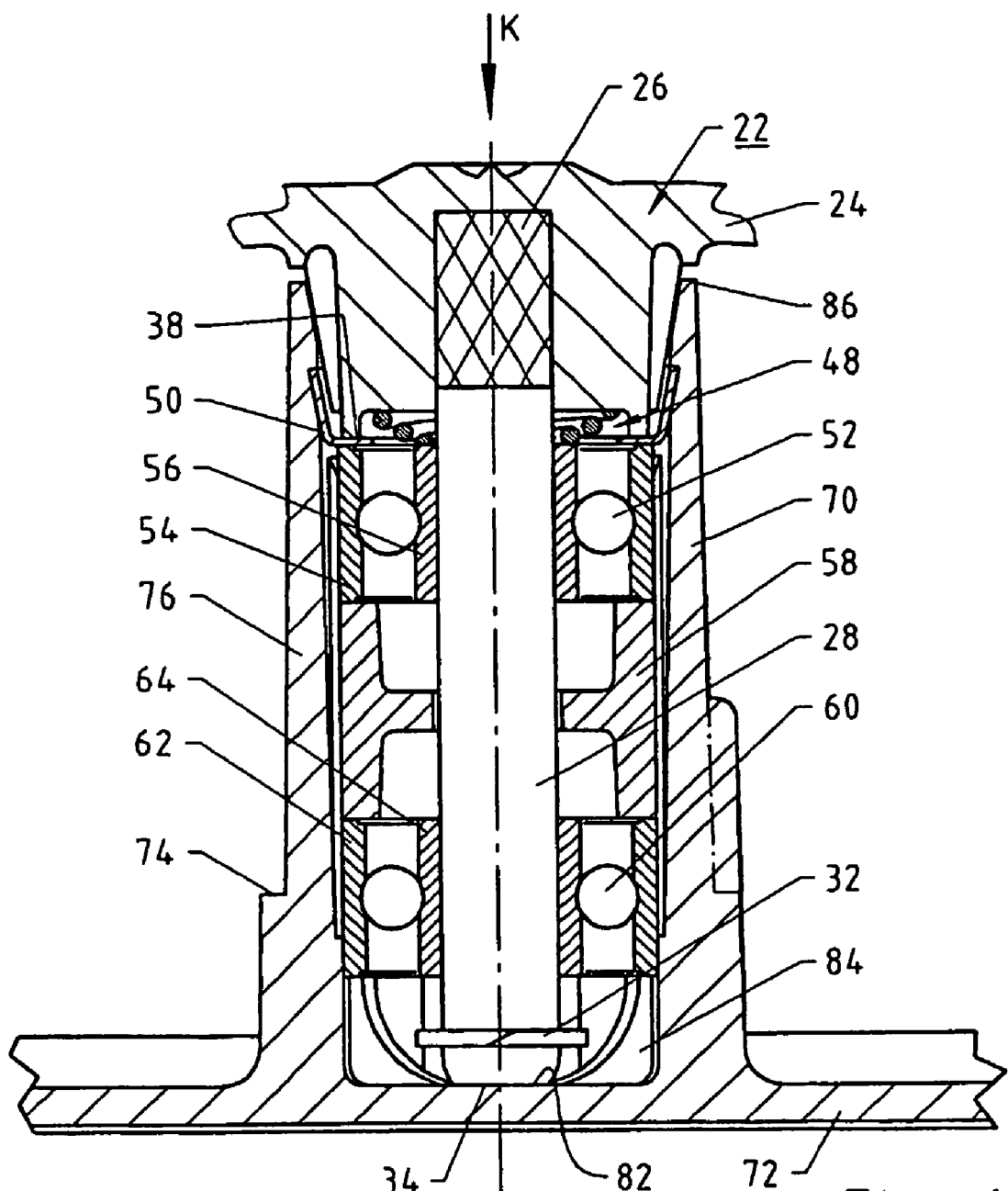
FIG. 6 is a schematic depiction showing a snapshot during the "marriage" of stator and rotor.

FIG. 6 shows a snapshot, so to speak, during the "marrying" operation in which shaft 28 of rotor 22, with rolling bearings 52, 60 located thereon, is introduced for the first time into inner recess 78 (see FIG. 3) of bearing support tube 70.

In this context, a force K is applied in the distal direction onto rotor 22, and because outer rings 54, 62 of rolling bearings 52, 60 are pressed with a press fit into ribs 80 (see FIG. 3) of bearing support tube 70, spring 48 is compressed by force K so that shaft 28 is displaced in the distal direction within ball bearings 52, 60, and projection 38 pushes via retaining washer 50 on outer ring 54 of ball bearing 52, and via spacer 58 also on outer ring 62 of ball bearing 60, and thus presses the two ball bearings 52, 60 into bearing support tube 70. As depicted in FIG. 6, spring 48 is only partly compressed in this process in order to prevent damage to it.

The pressing-in operation continues until outer ring 62 of distal ball bearing 60 is in contact against the proximal ends of ribs 84.

In this context, as depicted, retaining member 50 is displaced in bearing support tube 70 in the distal direction, i.e. downward, and digs into the material of bearing support tube 70 so that the entire bearing arrangement is latched or locked in bearing support tube 70. If an attempt were made to pull rotor 22 out of bearing support tube 70 oppositely to force K, retaining member 50 would only dig that much more deeply into the material of bearing support tube 70, so that the attachment here is therefore extraordinarily secure. There are, of course, many different solutions and components for a permanent latching system of this kind, and retention member 50 that is depicted therefore represents only a preferred embodiment.

After the pressing-in operation is complete, force K is removed and the result then is as shown in FIG. 7, i.e. spring 48 again presses shaft 28 upward in the proximal direction until snap ring 32 is again in contact against inner ring 64 of distal rolling bearing 60. The marriage is then complete. Spring 48 now clamps the two inner rings 56, 64 of rolling bearings 52, 60 against one another, which is favorable in terms of quiet operation of motor 20.

Figure 8:
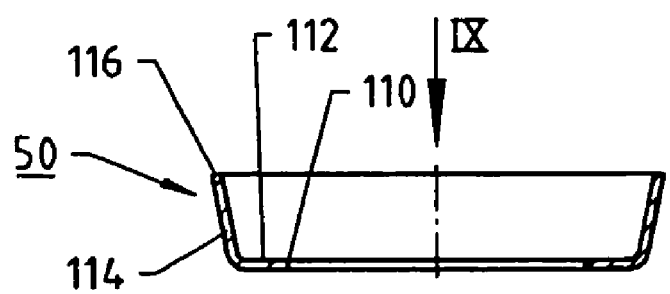
FIG. 8 is a section through a so-called retaining washer, viewed along line VIII—VIII of FIG. 9.
Figure 9:
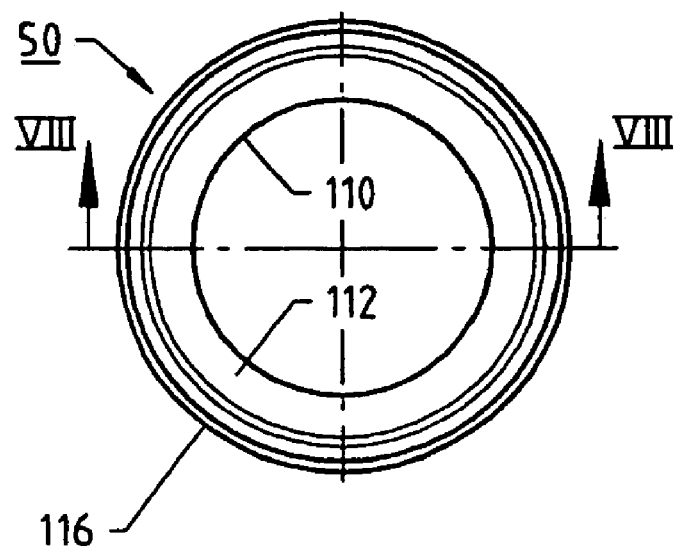
FIG. 9 is a plan view of the retaining washer, viewed in the direction of arrow IX of FIG. 8.

FIGS. 8 and 9 show a preferred embodiment of a retaining member 50. This has in the middle an opening 110 for the passage of shaft 28 and of the distal end of compression spring 48. Opening 110 is located in a flat part 112 that is adjoined toward the outside by a frustoconical portion 114 whose upper (in FIG. 8) end 116 digs into the material of bearing support tube 70 upon assembly because its diameter is greater than the inside diameter of bearing support tube 70.

Portion 114 could be divided, by slots that extend in the axial direction, into a plurality of individual prongs. In this case an annular retaining member of this kind can also be referred to as a prong washer or prong ring. It is usually not necessary, however, to provide such individual prongs. It can also be very advantageous to implement spring 48 and retaining member 50 together as a single component. These parts can, for example, be welded together, or spring 48 can be machined directly out of the material of retaining washer 50. In other ways as well, many variants and modifications are possible in the context of the present invention.

The invention claimed is:

1. An electric motor (20) comprising:
   a stator assembly (70, 80, 90) and an external rotor assembly (22, 24, 28, 52, 60) adapted to be rapidly mated together;
   said external rotor assembly including a rotor cup (24) coupled to a central shaft (28) having a proximal end (26) adjacent said rotor cup (24) and a distal end (34) provided with an enlargement (32);
   said stator assembly (90) including a bearing support tube (70) formed with an opening (78), facing said rotor cup, for receiving said central shaft (28) of said rotor assembly;
   a plurality of bearings (52, 60) which are mounted on said shaft for insertion into the bearing support tube (70), radial outer surfaces (54, 62) of said bearings being guided in an inner opening (78, 80) of the bearing support tube (70), said bearings serving to support said shaft (28), and of which a proximal bearing (52) is arranged closer to the rotor cup (24) than a distal bearing (60), the shaft (28) being axially displaceable with respect to the bearings (52, 60);

a retaining member (50), arranged between the rotor cup (24) and the proximal bearing (52), said retaining member serving to immobilize at least the proximal bearing (52) in its position in the bearing support tube (70) after assembly;

a spring member (48), effective between the proximal bearing (52) and the rotor cup (24), that pushes the rotor cup (24) away from the proximal bearing (52) in order to push the enlargement (32) provided on the shaft (28) in the direction of the distal end of the distal bearing (60); and a spacer (58) axially displaceably arranged in the bearing support tube (70) and defining a predetermined distance between the proximal bearing (52) and the distal bearing (60).

2. The motor according to claim 1, wherein
the rotor cup (24) is formed, on a side facing toward the proximal bearing (52), with a projection (38) that is shaped for engagement against said retaining member (50).

3. The motor according to claim 1, wherein the spacer (58) is a hollow cylindrical element formed with a radially inwardly protruding projection (59) which abuts the shaft (28).

4. The motor according to claim 2, wherein the spacer (58) is a hollow cylindrical element formed with a radially inwardly protruding projection (59) which abuts the shaft (28).

5. The motor according to claim 1,
wherein the enlargement (32) provided on the shaft (28) is a snap ring adapted to engage against a distal end of the distal bearing (60).

6. The motor according to claim 2,
wherein the enlargement (32) provided on the shaft (28) is a snap ring adapted to engage against a distal end of the distal bearing (60).

7. The motor according to claim 3,
wherein the enlargement (32) provided on the shaft (28) is a snap ring adapted to engage against a distal end of the distal bearing (60).

8. The motor according to claim 4,
wherein the enlargement (32) provided on the shaft (28) is a snap ring adapted to engage against a distal end of the distal bearing (60).

9. The motor according to claim 1, further comprising a mounting flange (72) formed integrally with a rotor-cup-remote end of said bearing support tube (70).

10. The motor according to claim 1,
wherein the bearing support tube (70) is closed except for said opening (78) facing said rotor cup (24).

11. The motor according to claim 2,
wherein the bearing support tube (70) is closed except for said opening (78) facing said rotor cup (24).

12. The motor according to claim 3,
wherein the bearing support tube (70) is closed except for said opening (78) facing said rotor cup (24).

13. The motor according to claim 4,
wherein the bearing support tube (70) is closed except for said opening (78) facing said rotor cup (24).

14. The motor according to claim 5,
wherein the bearing support tube (70) is closed except for said opening (78) facing said rotor cup (24).

15. The motor according to claim 6,
wherein the bearing support tube (70) is closed except for said opening (78) facing said rotor cup (24).

16. The motor according to claim 7,
wherein the bearing support tube (70) is closed except for said opening (78) facing said rotor cup (24).

17. The motor according to claim 8,
wherein the bearing support tube (70) is closed except for said opening (78) facing said rotor cup (24).

18. The motor according to claim 9,
wherein the bearing support tube (70) is closed except for said opening (78) facing said rotor cup (24).

19. A method of rapidly assembling together, into a predefined axial relation,
a rotor assembly and a stator assembly of an external-rotor electric motor, wherein
said rotor assembly has a rotor cup (24), a central shaft (28) and a plurality of bearings (52, 60), and said stator assembly has a bearing support tube (70), comprising the steps of:
securing said central shaft (28) to said rotor cup (24);
pre-mounting on said shaft (28), in sequence, a compression spring (48), a retaining member (50) and said plurality of bearings (52, 60), said bearings being axially slidable on the shaft (28);
aligning said shaft (28) with a central axis of said bearing support tube (70), and applying compression force (K) to said rotor assembly, thereby compressing said spring, inserting said bearings into said bearing support tube (70) and engaging said retaining member (50) with said bearing support tube (70); and
removing said compression force, thereby causing said spring to expand, and to axially displace said bearings (52, 60) relative to said shaft (28) so that said rotor assembly assumes said predefined axial relation to the bearing support tube (70).

20. The method according to claim 19,
wherein said step of applying compression force includes, after compressing said spring (48), continuing to apply force, thereby causing an axial projection (38) formed on the rotor cup (24) to push on the retaining member (50) at a location adjacent a nearest one (52) of said plurality of bearings (52, 60), and to thereby transfer the force (K) to that nearest bearing.

* * * * *